US005243311A

United States Patent [19]

Jones

[11] Patent Number: 5,243,311

[45] Date of Patent: Sep. 7, 1993

[54] WINDOW COMPRISING RESIN/DIAMOND LAYER

[76] Inventor: Barbara L. Jones, 80 Chisbury Close, Forest Park, Bracknell RG12 3TX, England

[21] Appl. No.: 760,104

[22] Filed: Sep. 16, 1991

[30] Foreign Application Priority Data

Sep. 14, 1990 [GB] United Kingdom ................. 9020096

[51] Int. Cl.[5] ........................... H01P 1/08; H01S 3/08

[52] U.S. Cl. ..................................... 333/252; 372/103

[58] Field of Search ................. 333/252; 372/103, 104

[56] References Cited

U.S. PATENT DOCUMENTS

| | | | |
|---|---|---|---|
| 2,932,806 | 4/1960 | Burr, Jr. | 333/252 |
| 3,095,550 | 6/1963 | Kilduff et al. | 333/252 |
| 3,895,313 | 7/1975 | Seitz | 372/103 |
| 4,688,009 | 8/1987 | Ferguson et al. | 333/252 |
| 4,719,436 | 1/1988 | Garwin et al. | 333/252 |

FOREIGN PATENT DOCUMENTS

| | | | |
|---|---|---|---|
| 578546 | 6/1959 | Canada | 333/252 |
| 149901 | 7/1988 | Japan | 333/252 |
| 8906979 | 6/1990 | South Africa . | |

*Primary Examiner*—Robert J. Pascal

*Assistant Examiner*—Benny Lee

*Attorney, Agent, or Firm*—Scully, Scott, Murphy & Presser

[57] ABSTRACT

A window for transmitting radiation of 20 microns or longer comprises a layer supported around its periphery by a frame. The layer comprises a first major surface on one side capable of receiving the radiation and a second major surface on the opposite side to the first major surface. The layer comprises a plurality of diamonds and a bonding polymeric resin capable of transmitting the radiation. The diamonds can, in one embodiment, be diamond plates located edge-on relative to neighbouring diamond plates.

12 Claims, 1 Drawing Sheet

WINDOW COMPRISING RESIN/DIAMOND LAYER

BACKGROUND OF THE INVENTION

This invention relates to a window for transmitting radiation such as microwave radiation.

The material which is used at present for making windows for transmitting microwave radiation is phenolic resin. While phenolic resin will transmit microwave radiation it has poor thermo-mechanical properties. To overcome this problem the window may be made in two layers which sandwich a cooling layer therebetween. Windows are difficult to make in this manner and, in any event, are not very efficient.

U.S. Pat. No. 3,895,313 describes a diamond window for transmitting a laser beam. In one form of the window, a plurality of diamond polygons or window panes are held in a network of metallic tubes.

SUMMARY OF THE INVENTION

According to the present invention there is provided a window, for transmitting radiation of wavelength 20 microns or longer comprising a supported layer presenting a first major surface on one side capable of receiving the radiation, and a second major surface on the opposite side to the first major surface, the layer comprising a plurality of diamonds and a bonding polymeric resin capable of transmitting the radiation.

DESCRIPTION OF PREFERRED EMBODIMENTS

The polymeric resin must be capable of transmitting the radiation. The presence of the diamond particles sharply increases the thermal conductivity of the resin layer by a factor of at least 3. One consequence of this is that the melt or working temperature of the resin layer is increased. Another consequence is that heat dissipation is improved. The window generally depicted in FIG. 1 may thus be used in circumstances where higher temperatures are experienced and for radiation of greater energy than is possible with prior art resin layers.

Figure 1:
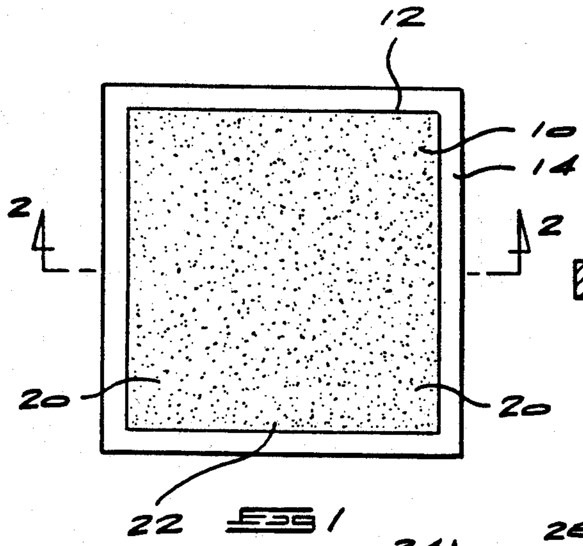
FIG. 1 is a plan view of an embodiment of a window of the invention.
Figure 2:
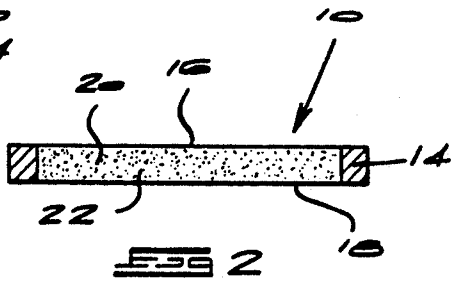
FIG. 2 is a section along the line 2—2 of FIG. 1.

The resin/diamond layer, as set forth in FIGS. 1 and 2, will be a supported layer and will act, in effect, as a window pane in the support. Typically, the support will be provided around at least a part of the periphery of the layer, for example by means of a frame. Such an arrangement is illustrated in FIG. 1. Other support means known in the art may be used. Typically, the resin/diamond layer will have a thickness in the range 20 to 500 microns, preferably 20 to 250 microns. As a general rule, the thickness of the layer will be less than a quarter of the wavelength of the radiation passing through it.

The polymeric resin will typically be selected from thermosetting resins, epoxy resins and PTFE. Examples of suitable thermosetting resins are phenolics, e.g. phenolformaldehyhe, imides, quinoxalines and imidazoles. Specific examples of suitable resins are those sold under the trade names RUTAPHEN SP 309® of Bakelite GmbH of Germany and modified PHENOLIC AR1004® of Advanced Resins Limited, Llandow Industrial Estate, Cowbridge, South Glamorgan, CF 77 PB, United Kingdom.

The resin/diamond layer may take any one of a variety of forms. Examples of suitable forms are illustrated by the accompanying drawings. Referring first to FIGS. 1 and 2, a window for transmitting radiation of wavelengths 20 microns or longer, i.e. microwave radiation, comprises a layer 10 supported around its periphery 12 by a frame 14. The layer 10 presents major flat surfaces 16 and 18 on opposite sides thereof (see FIG. 2). In use, the one major surface will receive the microwave energy which will then pass through the layer and exit through the other major surface. The layer 10 comprises a plurality of discrete diamond particles 20 embedded in a polymeric resin 22. The diamond particles will generally be uniformly dispersed through the polymeric resin. The diamond particles will generally have a size in the range 20 to 200 microns. The concentration of the diamonds will vary according to the application to which the window is to be put. In general, the concentration of the diamonds in the layer will not exceed 65 percent by volume. A mixture of diamond particles of varying sizes may be used in the layer.

Figure 3:
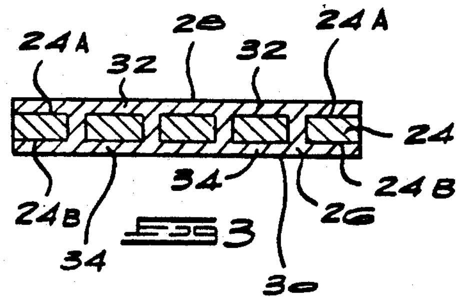
FIG. 3 is a sectional side view of a second embodiment of a layer for a window of the invention.

FIG. 3 illustrates another example of a resin/diamond layer. In this layer, a plurality of diamond plates 24 are located in a polymeric resin 26. As with the embodiment of FIGS. 1 and 2, major flat surfaces 28 and 30 are provided on opposite sides thereof. The diamond plates 24 are positioned edge-on relative to their neighbors and form a monolayer of diamonds across the layer. If the resin in the regions 32 and 34 to either side of the upper and lower surfaces **24*a* and 24*b*** of the diamond plates is thin, e.g. no more than 5 microns in thickness, then the window can be used for transmitting IR radiation as well as microwave radiation. Where these regions are thicker, then the layer is suitable for transmitting microwave radiation only.

Figure 4:
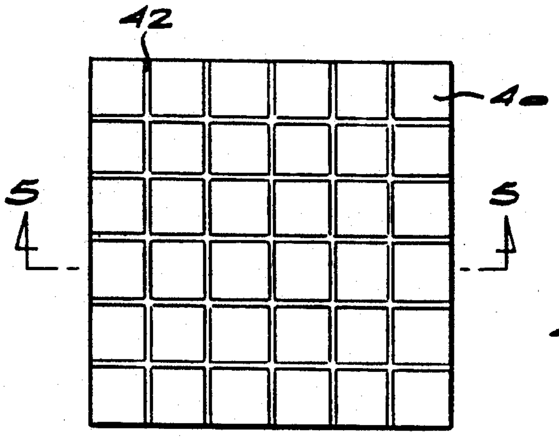
FIG. 4 is a plan view of another embodiment of a layer for a window of the invention.
Figure 5:
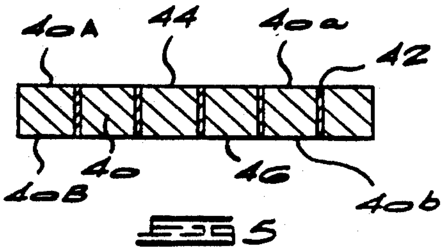
FIG. 5 is a section along the line 5—5 of FIG. 4.

A third embodiment of the invention is illustrated by FIGS. 4 and 5. Referring to these figures, the resin/diamond layer comprises a plurality of diamond plates 40 each of which is located edge-on relative to its neighbors. The diamond plates 40 are bonded to each other by means of a bonding polymeric resin 42. The resin 42 thus provides a bonding network between the diamond plates. The top surface **40*a* and bottom surface 40*b* of each diamond plate 40 is not covered by resin (see FIG. 5). The layer, as with the previous two embodiments, provides major flat surfaces 44 and 46** on opposite sides thereof. The layer of this embodiment may be used for transmitting IR or microwave radiation.

Figure 6:
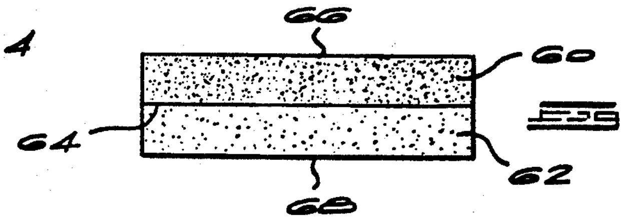
FIG. 6 is a sectional side view of another embodiment of a layer for a window of the invention

The resin/diamond layer may comprise two or more sections of differing diamond concentration. Each layer will thus have a different dielectric constant with the one layer acting, in effect, as an anti-reflective coating for the other layer. An example of such a layer is illustrated by FIG. 6. Referring to this figure, the layer comprises two sections 60 and 62 bonded to each other along the interface 64. This interface lies intermediate the major surfaces 66 and 68 of the layer. The diamond concentration of layer 60 is higher than that of the layer 62.

The resin/diamond layers of the invention may be made in a mold by suitably locating resin and diamond particles in the mould which is heated, typically, to a temperature of 60° C. Thereafter, pressure is applied to the resin and diamond particles and the temperature raised until the melting point of the resin is reached. The pressure is released, the mold removed and the thus produced layer allowed to cool. If diamond plates are used, they will generally be positioned in the mold and the resin thereafter introduced into the mold. If diamond particles are used, they will generally be mixed with the resin prior to introduction into the mold.

I claim:

1. A window for transmitting electromagnetic radiation of wavelength 20 microns or longer comprising a resin/diamond-containing layer having a first major surface thereof for receiving electromagnetic radiation and a second major surface on a side opposite to the first major surface, wherein said resin/diamond layer has a thickness from 20 to 500 microns containing a plurality of diamond particles and a bonding polymeric resin for transmitting electromagnetic radiation.

2. A window according to claim 1 wherein the resin/diamond layer is supported around at least part of a periphery of said resin/diamond layer.

3. A window according to claim 1 wherein the thickness of the resin/diamond layer is in the range of from 20 to 250 microns.

4. A window according to claim 1 wherein the resin/diamond layer comprises a plurality of diamond particles bonded to each other by the resin which is arranged in a network located between the diamond particles.

5. A window according to claim 4 wherein the diamond particles are diamond plates having edges, each diamond plate having edges aligned with the corresponding edges of neighboring diamond plates.

6. A window according to claim 1 wherein the resin/diamond layer comprises a plurality of diamond particles embedded in the resin.

7. A window according to claim 6 wherein the diamond particles are diamond plates having edges, each diamond plate having edges aligned with the corresponding edges of neighboring diamond plates.

8. A window according to claim 6 wherein the diamond particles have a size in the range of 20 to 200 microns.

9. A window according to claim 8 wherein the diamond particles comprise up to 65 percent by volume of the resin/diamond layer.

10. A window according to claim 1 wherein the resin is selected from the group consisting of thermosetting resins, epoxy resins and PTFE.

11. A window according to claim 10 wherein the thermosetting resin is a phenolic resin.

12. A window according to claim 1 wherein the layer comprises two or more sections bonded to each other at an interface or interfaces which are located intermediate the major surfaces, the sections differing in diamond concentration.

* * * * *